Patented Dec. 8, 1942

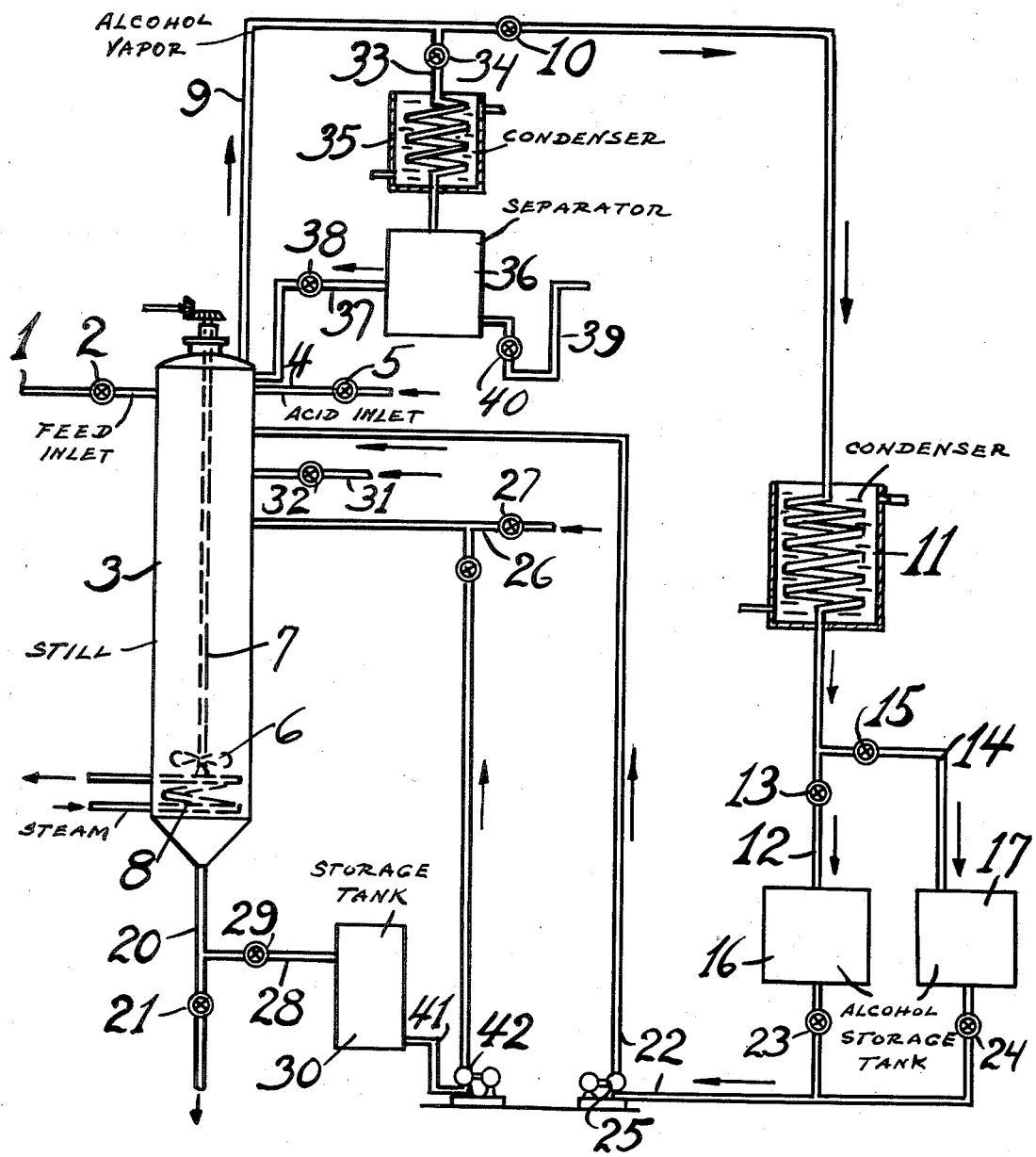

2,304,230

UNITED STATES PATENT OFFICE 2,304,230

METALLIC SALTS OF MAHOGANY SULPHONATE AND THE PROCESS OF MAKING THE SAME

Francis M. Archibald, Elizabeth, and John B. Holtzclaw, Roselle, N. J., assignors to Standard Oil Development Company, a corporation of Delaware Application December 19, 1939, Serial No. 310,084

9 Claims. (Cl. 252—353)

This invention relates to improved metal petroleum mahogany sulphonate and particularly to an improved method for the preparation of metal petroleum mahogany sulphonate.

Sulfuric acid, both concentrated and fuming, is used in refining lubricating oil distillates derived from petroleum. The sulphuric acid reacts with the petroleum oil, producing a black sludge containing unreacted sulfuric acid and certain types of sulphonic acid which are insoluble in oil and soluble in water and are known as green sulphonic acids due to their characteristic color. The acid in reacting with the oil also produces other types of sulphonic acids that are soluble in the oil and insoluble in water that do not separate with the sludge and are known as mahogany sulphonic acids due to their characteristic color. After the separation of the sludge, the mahogany sulphonic acids are usually recovered from the oil in the form of alkali salts, that is, alkali salts are generally produced by the addition of an alkali such as sodium carbonate or sodium hydroxide followed by the extraction of the alkali mahogany sulphonates formed thereby by means of a solvent, generally alcohol, such as methyl, ethyl or isopropyl alcohol. The mahogany alkali sulphonates may be used in the preparation of metal sulphonates. The general method used heretofore was to react a metal salt such as alum with the alkali mahogany sulphonates to form aluminum sulphonates. The disadvantage in following this procedure was that only part of the alum reacted with sodium sulphonates and the unreacted part of the alum was discarded.

An object of this invention is to provide a method whereby substantially all of the metal used is reacted with the alkali sulphonate salts and there is no substantial waste of the metal.

Another object of this invention is to prepare a metal sulphonate which is substantially free of sodium sulphonate.

These and other objects of the present invention will be understood on reading the following description with reference to the accompanying drawing.

Referring to the drawing, numeral 1 refers to a pipe arranged with valve 2 through which a crude alcoholic sulphonate liquor is passed into still 3. The crude alcoholic sulphonate liquor is obtained by extracting with 50% isopropyl alcohol a lubricating oil that has been subjected to a treatment with concentrated or fuming sulphuric acid and neutralized with an alkali after the separation of the acid sludge. The liquor contains about 2 to 10% of sodium sulphonate together with other salts, such as sodium bicarbonate, sodium sulphate, sodium sulphite and sodium sulphate, dissolved in the dilute aqueous isopropyl alcohol of about 50% concentration. Other solvents may be used in the extraction of these sulphonates from the acid treated lubricating oils, such as methyl or ethyl alcohols.

About 1500 gallons of crude alcoholic sulphonate liquor containing about 8% of sodium sulphonates are charged into still 3. The crude alcoholic sulphonate liquor may be further diluted by the addition of dilute alcohol if found to be too viscous. About 5 gallons of strong sulphuric acid or its equivalent of weaker acid are added to the still through pipe 4 arranged with valve 5. This acid is added to neutralize the alkali reacting salts. About 200 gallons of a dilute aluminum sulphate solution to be referred to hereafter are added. The mixture is then agitated by means of propeller blades 6 mounted on shaft 7 rotated by means not shown. Other means of mixing may be used, such as recycling, blowing, etc. The mixture after it is well agitated is heated by means of steam coil 8 and distilled to remove alcohol. Alcohol vapors are removed through pipe 9 arranged with valve 10 and passed through condenser 11. The condensed alcohol according to its concentration is then removed through pipes 12 and 14 arranged with valves 13 and 15 to storage tanks 16 and 17.

The residue in the still after removal of the alcohol separates into two layers. The upper layer contains the sulphonates in the form of a viscous curd and the lower layer an aqueous solution of inorganic salts—those present in the original liquor together with some unreacted alum and sodium sulphate that had been formed by the reaction of the aluminum sulphate on the sodium sulphonates. If the curd is not definitely floating on the aqueous salt layer it is necessary at this stage to boil off some more water and increase the specific gravity of the aqueous layer and thereby make the curd float.

The aqueous salt layer of about 600 to 700 gallons, is run to waste through pipe 20 provided with valve 21. To the curd in the still is now added about 500 gallons of 75–80% of alcohol from storage tank 16 through pipe 22 arranged with valves 23 and 24 by means of pump 25 to dissolve the curd. To the still 3 through pipe 26 provided with valve 27 is added an aqueous solution composed of 100 gallons of water with 400 pounds of aluminum sulphate dissolved therein. Other aluminum solutions may be used but a solution of aluminum sulphate is preferred. The still is then refluxed for about 5 hours, after which the alcohol is distilled off through pipe 9 and passed through condenser 11 to alcohol storage tanks 16 and 17. The main part of the alcohol distilled here may be used in the extraction of the acid treated lubricating oils for the recovery of the mahogany sulphonates. After the alcohol is removed, curd formation of the aluminum sulphonate takes place in still 3 and a two-layer separation is obtained. The lower layer is an aqueous solution of aluminum sulphate and other salts and may be removed through pipes 20 and 28 arranged with valve 29 to a storage tank 30. This aluminum sulphate solution may be used in the first treatment of the extract of alkali sulphonates being passed to still 3 by means of pipe 41 and pump 42.

The upper curd layer in the still is composed of aluminum sulphonate with about 50% of water. To this layer is then added through pipe 31 provided with valve 32 a naphtha having a boiling range of about 300° to 450° F. This mixture is first agitated and then heated by means of steam coil 8 to distill over a mixture of naphtha and water through pipe 9 and pipe 33 provided with valve 34, through condenser 35 to separator 36, from which the naphtha may be returned back to the still through pipe 37 provided with valve 38 and the water removed through pipe 39 provided with valve 40. After the water is reduced to about 15%, the finished product is removed through outlet 20, cooled and placed in storage. The analysis of the final product is aluminum sulphonate 30 to 60%, sodium mahogany sulphonate 0.1 to 2.0%, naphtha 30 to 60%, water 5 to 15%, and aluminum sulphate 2 to 5%.

This product has been particularly applicable for use as a wetting agent with asphalt cutback. The mixture is prepared by adding about 2.5% of the naphtha aluminum mahogany sulphonate to 97.5% of an asphalt, which mixture has the property of adhering firmly to a moist stone aggregate. The solution of the aluminum sulphonate in the low boiling naphtha is particularly advantageous in that it can be readily mixed into an asphalt, either a cutback or a straight asphalt, with the resulting improvement in the wetting power of the asphalt.

Other highly water soluble metal salts such as ferric chloride, calcium chloride, lead nitrate, copper sulphate, manganese chloride, etc., may be used in place of the aluminum sulphate. The solvents used are those that are slightly soluble in water at least 5%, such as isopropyl alcohol or ether, methyl or butyl alcohol, etc. Isopropyl ether is the preferred solvent.

We claim:

1. A method of manufacturing polyvalent metal petroleum mahogany sulphonates which comprises contacting a solvent extract of alkali salts of a mahogany sulphonate obtained from a sulphuric acid treated lubricating petroleum oil in which the solvent is selected from the group consisting of low molecular weight aliphatic alcohols and ethers with sulphuric acid to neutralize the free alkalinity and with a highly water-soluble polyvalent metal salt, distilling off the solvent until a two-layer separation is obtained, separating the lower layer of aqueous solution of inorganic salts and dissolving the upper layer in an organic solvent selected from the group consisting of low molecular weight aliphatic alcohols and ethers, adding a solution containing a highly water-soluble polyvalent metal salt, distilling off the solvent until a two-layer separation is obtained, separating the lower aqueous layer of inorganic salts, adding a low boiling petroleum naphtha to the upper layer and refluxing through a separator to separate the major fraction of water present there to obtain a solution of the polyvalent metal petroleum mahogany sulphonates in a low boiling petroleum naphtha.

2. Method of preparing polyvalent metal petroleum mahogany sulphonates according to claim 1 in which the water and low boiling petroleum naphtha solution are distilled off until less than 15% of water is present.

3. Method of preparing aluminum petroleum mahogany sulphonates which comprises treating an alcoholic extract obtained from a neutralized acid treated lubricating petroleum oil from which sludge has been removed with sulphuric acid and aluminum sulphate, distilling the alcohol from the extract until a two-layer separation takes place in the residual solution, separating the aqueous clear solution and redissolving the curdy portion in an alcohol, then adding more aluminum sulphate solution to the alcohol solution, distilling to separate the alcohol and allowing the residual to settle into two-layers, dissolving the curdy layer in a naphtha solution and refluxing through a separator to separate the major fraction of the water.

4. A method of manufacturing aluminum petroleum mahogany sulphonates according to claim 3 in which the alcohol solution added is from 70 to 80% concentration.

5. Method of manufacturing aluminum petroleum mahogany sulphonates according to claim 3 in which the petroleum solvent naphtha has a boiling range of 300° to 450° F.

6. A method of manufacturing aluminum mahogany sulphonate which comprises treating a boiling aqueous alcoholic solution of the alkali mahogany sulphonate with aluminum sulphate in countercurrent stages and obtaining the aluminum sulphonate as an aqueous curd by distilling the alcohol.

7. A method according to claim 6 in which the alcohol is added at each stage and is removed at each stage to aid the separation of the curd from the inorganic salts which are added to the solutions after the curd is dissolved by the alcohol in a series of steps, and the final curd is dehydrated by distilling with naphtha as an entraining agent and recovered as a solution in naphtha.

8. A method of manufacturing aluminum petroleum mahogany sulphonates which comprises contacting a solvent extract of alkali salts of a mahogany sulphonate obtained from a sulphuric acid treated lubricating petroleum oil in which the solvent is selected from the group consisting of low molecular weight aliphatic alcohols and ethers with sulphuric acid to neutralize the free alkalinity and with aluminum sulphate, distilling off the solvent until a two-layer separation is obtained, separating the lower layer of aqueous solution of inorganic salts and dissolving the upper layer in an organic solvent selected from the group consisting of low molecular weight aliphatic alcohols and ethers, adding a solution containing aluminum sulphate, distilling off the solvent until a two-layer separation is obtained, separating the lower aqueous layer of inorganic salts, adding a low boiling petroleum naphtha to the upper layer and refluxing through a separator to separate the major fraction of water present there to obtain a solution of aluminum petroleum mahogany sulphonates in a low boiling petroleum naphtha.

9. Method of preparing aluminum petroleum mahogany sulphonates according to claim 8 in which the water and low boiling petroleum solvent solution are distilled off until less than 15% of water is present.

FRANCIS M. ARCHIBALD.
JOHN B. HOLTZCLAW.